United States Patent
Suresh et al.

(10) Patent No.: US 10,102,671 B2
(45) Date of Patent: Oct. 16, 2018

(54) SYSTEMS FOR GENERALIZING NON-UNIFORM RATIONAL B-SPLINE AND APPLICATION OF SYSTEMS

(71) Applicant: Wisconsin Alumni Research Foundation, Madison, WI (US)

(72) Inventors: Krishnan Suresh, Middleton, WI (US); Alireza H. Taheri, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 65 days.

(21) Appl. No.: 15/428,331

(22) Filed: Feb. 9, 2017

(65) Prior Publication Data

US 2018/0225871 A1     Aug. 9, 2018

(51) Int. Cl.
  *G06T 17/00*  (2006.01)
  *G06T 17/30*  (2006.01)
  *G06T 17/20*  (2006.01)

(52) U.S. Cl.
  CPC ............. *G06T 17/30* (2013.01); *G06T 17/20* (2013.01)

(58) Field of Classification Search
  CPC ......... G06T 17/30; G06T 17/20; G06T 19/00; G06T 17/00; G06T 17/10; G06T 17/005
  See application file for complete search history.

(56) References Cited

U.S. PATENT DOCUMENTS

| | | | | |
|---|---|---|---|---|
| 5,883,631 A | * | 3/1999 | Konno | G06T 17/30 345/423 |
| 2004/0095352 A1 | * | 5/2004 | Huang | G06T 13/40 345/473 |
| 2007/0195084 A1 | * | 8/2007 | Cheung | G06T 17/30 345/420 |
| 2009/0237399 A1 | * | 9/2009 | Bailey | G06T 17/20 345/420 |

(Continued)

OTHER PUBLICATIONS

Carla Manni, Generalized B-splines as a tool in isogeometric analysis, Oct. 14, 2010, https://www.sciencedirect.com/science/article/pii/S0045782510002884.*

(Continued)

*Primary Examiner* — Xilin Guo
(74) *Attorney, Agent, or Firm* — Quarles & Brady LLP (57) ABSTRACT

Systems and methods for generating approximations and other representations of data in a data set include a generalized non-uniform rational B-splines (NURBS) framework that facilitates optimized computer-generated representations having high accuracy and requiring less computing resources than previous frameworks capable of achieving similar accuracy. The framework includes a set of rational basis functions that define a mesh parametrization of the data set; these rational basis functions are based on the typical NURBS rational basis functions, but decoupled to provide discrete weights in each direction of a parametrized space. The value of each decoupled weight can be individually altered to improve the accuracy of the representation in (Continued)

the corresponding direction without altering the underlying mesh parametrization. The accuracy and efficiency of the proposed methods, particularly for data sets including discontinuities or localized gradients, is demonstrated through numerical experiments.

20 Claims, 6 Drawing Sheets
(4 of 6 Drawing Sheet(s) Filed in Color)

(56) References Cited

U.S. PATENT DOCUMENTS

| | | | |
|---|---|---|---|
| 2010/0004769 A1* | 1/2010 | Holden | G06F 17/5086 700/97 |
| 2013/0185035 A1* | 7/2013 | Andrade | G06T 17/00 703/2 |
| 2013/0329038 A1* | 12/2013 | Hager | B25J 9/1697 348/113 |
| 2017/0177745 A1* | 6/2017 | Sheng | G06F 17/50 |
| 2017/0357736 A1* | 12/2017 | Schmitter | G06F 17/11 |

OTHER PUBLICATIONS

Bazilevs, et al., USACM Conference on Isogeometric Analysis and Meshfree Methods, Oct. 10-12, 2016, La Jolla, California.
Hughes, et al., Isogeometric analysis: CAD, finite elements, NURBS, exact geometry and mesh refinement. Computer Methods in Applied Mechanics and Engineering, Elsevier, 2005, 194 (39-41), pp. 4135-4195.

* cited by examiner

SYSTEMS FOR GENERALIZING NON-UNIFORM RATIONAL B-SPLINE AND APPLICATION OF SYSTEMS

STATEMENT REGARDING FEDERALLY SPONSORED RESEARCH OR DEVELOPMENT

This invention was made with government support under CMM11232508 awarded by the National Science Foundation. The government has certain rights in the invention.

BACKGROUND OF THE INVENTION

This disclosure relates generally to systems and methods of representing curves and surfaces in computer graphics and computational analysis, and more specifically to systems and methods for generalizing non-uniform rational B-splines as curve and surface representations, as well as to particular applications of the present systems and methods.

Non-Uniform Rational B-Splines (NURBS) are presently one of the most popular curve and surface representations in computer graphics. NURBS have the flexibility to capture analytic geometries such as lines, circles, ellipses, spheres, tori, etc., as well as free-form geometries. Representation of a NURBS structure is compact and unambiguous and can be evaluated efficiently, making NURBS ideal for storage and data exchange. NURBS form the backbone of computer aided design (CAD) and are also used extensively in several applications including material modeling, reverse engineering, manufacturing, isogeometric analysis, and bio-engineering.

There are several known concepts underlying NURBS, such as control points, basis functions, weights, knots, etc. For example, a typical 2D NURBS curve is represented as:

$$\left.\begin{array}{l}x(\xi) = \sum_{i=0}^{n} R_{i,p}(\xi)x_i \\ y(\xi) = \sum_{i=0}^{n} R_{i,p}(\xi)y_i\end{array}\right\} \; 0 \leq \xi \leq 1; \; R_{i,p}(\xi) = \frac{N_{i,p}(\xi)w_i}{\sum_{j=0}^{n} N_{j,p}(\xi)w_j}$$

where p is the degree of the basis functions, (n+1) is the number of control points, $(x_i, y_i)$ are the control points, $R_{i,p}(\xi)$ are the rational basis functions, $w_{i,j}$ are positive weights and $N_{i,p}$ are the normalized B-spline functions.

In NURBS, the same set of rational basis functions and weights are employed for all coordinates, i.e., modifying a weight or a rational basis function will affect all coordinates. This coupling turns out be essential in CAD to exactly capture popular analytic conic curves and surfaces. Unfortunately, this coupling has been adopted in several applications of NURBS, and is turning out to be a liability in non-CAD applications. For example, the coupled representation of NURBS cannot accurately capture discontinuities and localized gradients in field modeling. To understand this deficiency of NURBS, consider a natural extension of the typical NURBS equation above, where they parametrization is replaced with a field (u) parametrization:

$$\left.\begin{array}{l}x(\xi) = \sum_{i=0}^{n} R_{i,p}(\xi)x_i \\ u(\xi) = \sum_{i=0}^{n} R_{i,p}(\xi)u_i\end{array}\right\} \; 0 \leq \xi \leq 1$$

The parametrization provides a NURBS field u(x) defined over a one-dimensional geometry. This forms the basis of isogeometric analysis (IGA), which has opened new opportunities in integrating CAD and analysis. Once again, the weights and rational basis functions are coupled, i.e., modifying the weight will affect both the mesh parametrization and the field.

The liability of this coupling is revealed when attempting to fit, or approximate, the field u(x) over a domain [0,1]. Using a suitable NURBS curve-fitting algorithm, of which there are many, a set of control points and knots are defined and then optimized; for a linear mesh parametrization, the optimization leads to a linear least-squares problem. If the field is sufficiently smooth, the approximation can be usefully accurate. However, for rapidly varying functions, the fit can be very poor. The same is true for a field defined over a curved geometry. A classic example is the deflection of a curved beam; the curved beam can be represented in NURBS as $x(\xi)$, $y(\xi)$ and the deflection as $u(\xi)$. All three share the same set of rational basis functions and weights, with several advantages. However, modifying the weights will completely alter the geometry of the curved beam and is therefore disallowed.

While there have been some significant research activities in improving NURBS to handle rapid variations and discontinuities in a function or geometry to be represented, the concept of decoupling the rational basis functions along different directions, as described in this disclosure, has not been explored; as shown herein, the decoupling concept can be used to provide a generalization of NURBS that significantly increases the accuracy of NURBS representations.

SUMMARY OF THE INVENTION

The present invention overcomes the aforementioned drawbacks by providing systems and processes for representing surfaces, functions, fields, geometries, and the like, in computer graphics and computational analysis using a generalized NURBS framework. Within the proposed framework, the rational basis functions underlying a NURBS representation are decoupled from each other along different coordinate system directions. The associated weights may correspondingly be decoupled, and as a result a weight affecting one direction can be changed without affecting all of the points in the representation. The weights may thus be used as additional design variables in certain applications. Several such applications, including CAD, field approximation in isogeometric analysis, and topological optimization of shapes and structures, are described herein using the generalized NURBS framework.

In one aspect, the disclosure provides a method for using B-splines to represent a data set in a computing environment by receiving electronic data comprising the data set and generating a first generalized non-uniform rational B-spline (G-NURBS) representation of the electronic data. The first G-NURBS representation is defined by: a plurality of control points that determine a shape of one or more of the B-splines in a first direction and a second direction; a plurality of weights each associated with a corresponding control point of the plurality of control points, the plurality of weights including a plurality of first weights modifying influence of the corresponding control point on the shape in the first direction, and a plurality of second weights modifying influence of the corresponding control point in the second direction; and, a plurality of rational basis functions each depending on a corresponding weight of the plurality of weights, the plurality of rational basis functions including a plurality of first rational basis functions associated with the first direction and a plurality of second rational basis functions associated with the second direction. Each of the plurality of control points is associated with one of the first rational basis functions, one of the second rational basis functions, the first weight on which the corresponding first rational basis function depends, and the second weight on which the corresponding second rational basis function depends.

Generating the first G-NURBS representation may include setting a first selected weight of the plurality of weights to a first value, and the method may further include generating, based on the first G-NURBS representation, a second G-NURBS representation of the electronic data, the second G-NURBS representation including the plurality of weights with the first selected weight set to a second value different from the first value and all other weights having an unchanged corresponding value. The method may further include determining a mesh parametrization of the data set, the mesh parametrization extending in a first direction and a second direction, wherein the first G-NURBS representation is generated based at least in part on the mesh parametrization, and wherein each of the weights has a corresponding value of a plurality of values and the rational basis functions are decoupled from each other such that changing the corresponding value of any one of the weights maintains the mesh parametrization unchanged.

The method may further include estimating a first $L_2$-norm error of the first G-NURBS representation relative to the mesh parametrization, determining that the first $L_2$-norm error indicates the first G-NURBS representation is not converged with the data set, identifying an unconstrained optimization problem associated with the data set, modifying the corresponding value of one or more of the weights to produce a second G-NURBS representation of the electronic data that corresponds to a solution to the unconstrained optimization problem, estimating a second $L_2$-norm error of the second G-NURBS representation relative to the mesh parametrization, and determining that the second $L_2$-norm error indicates the second G-NURBS representation is converged with the data set.

In another aspect, the present disclosure provides a computing device having memory storing device logic, and a processor in communication with the memory and executing the device logic. Executing the device logic causes the processor to receive electronic data and transform, using a framework implemented in the device logic, the electronic data to produce an optimized representation of the electronic data in at least a first direction and a second direction, the optimized representation composed of a plurality of non-uniform rational B-spline (NURBS) curves, and the framework having a plurality of rational basis functions including: a plurality of first rational basis functions each having parameters that the processor applies to the electronic data to define one of the plurality of NURBS curves in the first direction; and, a plurality of second rational basis functions each having parameters that the processor applies to the electronic data to define the one of the plurality of NURBS curves in the second direction, wherein modifying any parameter of one of the first rational basis functions does not require modification of any parameter of any of the second rational basis functions. Each of the plurality of NURBS curves may include a corresponding plurality of control points that control a shape of the NURBS curve, and each of the rational basis functions determines a location of one of the control points in one of a plurality of directions including the first direction and the second direction. Each of the rational basis functions may include a corresponding weight of a plurality of weights that the processor applies to the electronic data to determine influence of each of the control points on the shape of the corresponding NURBS curve. Each of the weights affects the influence of only one of the control points in only one of the plurality of directions. The electronic data may describe one of a rapidly-varying function and a discontinuous function.

The optimized representation may further represent the electronic data in a third direction that cooperates with the first and second directions to define a three-dimensional space; the plurality of NURBS curves may cooperate to form at least one NURBS surface, and the plurality of rational basis functions may further include a plurality of third rational basis functions each having parameters that the processor applies to the electronic data to define one of the NURBS curves in the third direction, wherein modifying any parameter of one of the first rational basis functions or one of the second rational basis functions does not require modification of any parameter of any of the third rational basis functions. The NURBS surface may have a shape defined at least in part by a plurality of control points; the framework associates each of the control points with a corresponding subset of the plurality of rational basis functions, each subset including one of the first rational basis functions, one of the second rational basis functions, and one of the third rational basis functions. Each of the plurality of rational basis functions depends upon a corresponding weight of a plurality of weights that the processor applies to the electronic data to determine influence of each of the control points on the shape of the first NURBS surface, the plurality of weights being decoupled from each other such that changing a corresponding value of one of the weights does not require changing the corresponding value of any other of the weights.

To transform the electronic data, the processor may execute the device logic to obtain a mesh parametrization of the electronic data, and iterate an optimization process to produce, using the framework and the mesh parametrization, a sequential plurality of iterative representations of the electronic data, the optimized representation being the final iterative representation, wherein each successive iterative representation of the plurality of iterative representations is produced by modifying one or more of the weights in an immediately previous iterative representation, and associated with the mesh parametrization without deforming the mesh parametrization.

In another aspect, the present disclosure provides a method that includes receiving electronic data to be approximated in a computing environment, and producing an optimized representation of the electronic data in the computing environment, the optimized representation composed of a plurality of non-uniform rational B-spline (NURBS) curves that conform to a framework comprising a plurality of rational basis functions including: a first rational basis function having parameters that the processor applies to the electronic data to define a first NURBS curve of the plurality of NURBS curves in the computing environment; and, a second rational basis function having parameters that the processor applies to the electronic data to define the first NURBS curve in the computing environment, wherein modifying any parameter of the first rational basis function does not require modification of any parameter of the second rational basis function. Producing the optimized representation may include producing the plurality of NURBS curves within the framework, wherein the first rational basis function defines the first NURBS curve in a first direction and the second rational basis function defines the first NURBS curve in a second direction.

Producing the optimized representation may include producing a plurality of control points that control a shape of the first NURBS curve, each of the rational basis functions determining a location of one of the control points in one of a first direction and a second direction. Producing the optimized representation comprises may include determining a plurality of weights, and using the plurality of weights and the electronic data to determine influence of each of the control points on the shape of the first NURBS curve, a first of the weights determining influence in the first direction and a second of the weights determining influence in the second direction. The method may further include determining a rapidly-varying function, a discontinuous function, or a geometry described by the electronic data, the optimized representation approximating the rapidly-varying function, the discontinuous function, or the geometry. The optimized representation may approximate the geometry in a first direction, a second direction, and a third direction that cooperate to define a three-dimensional space of the computing environment, and the framework may further include a third rational basis function having parameters that define the first NURBS curve in the computing environment, wherein modifying any parameter of one of the first rational basis function or the second rational basis function does not require modification of any parameter of the third rational basis function. Producing the optimized representation may include iterating an adaptive optimization process to produce, using the framework and the mesh parametrization, a sequential plurality of iterative representations of the electronic data, the optimized representation being the final iterative representation, wherein each successive iterative representation of the plurality of iterative representations is produced by modifying a corresponding parameter of the first rational basis function in an immediately previous iterative representation of the plurality of iterative representations, and is associated with the geometry without deforming the geometry.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

This patent application file contains at least one drawing executed in color. Copies of this patent or patent application publication with color drawings will be provided by the Office upon request and payment of the necessary fee.

DETAILED DESCRIPTION OF THE INVENTION

Described here are systems and computer-implemented methods for performing computational problems using a generalization of non-uniform rational B-splines (NURBS). The systems and methods can be implemented as an enhancement to existing graphics- and other data-processing software to speed up and increase the accuracy of algorithmic modeling of curves and surfaces. Example applications, in both general fields of computation as well as specific problems, are provided to demonstrate the effectiveness of the described systems and methods.

Figure 1:
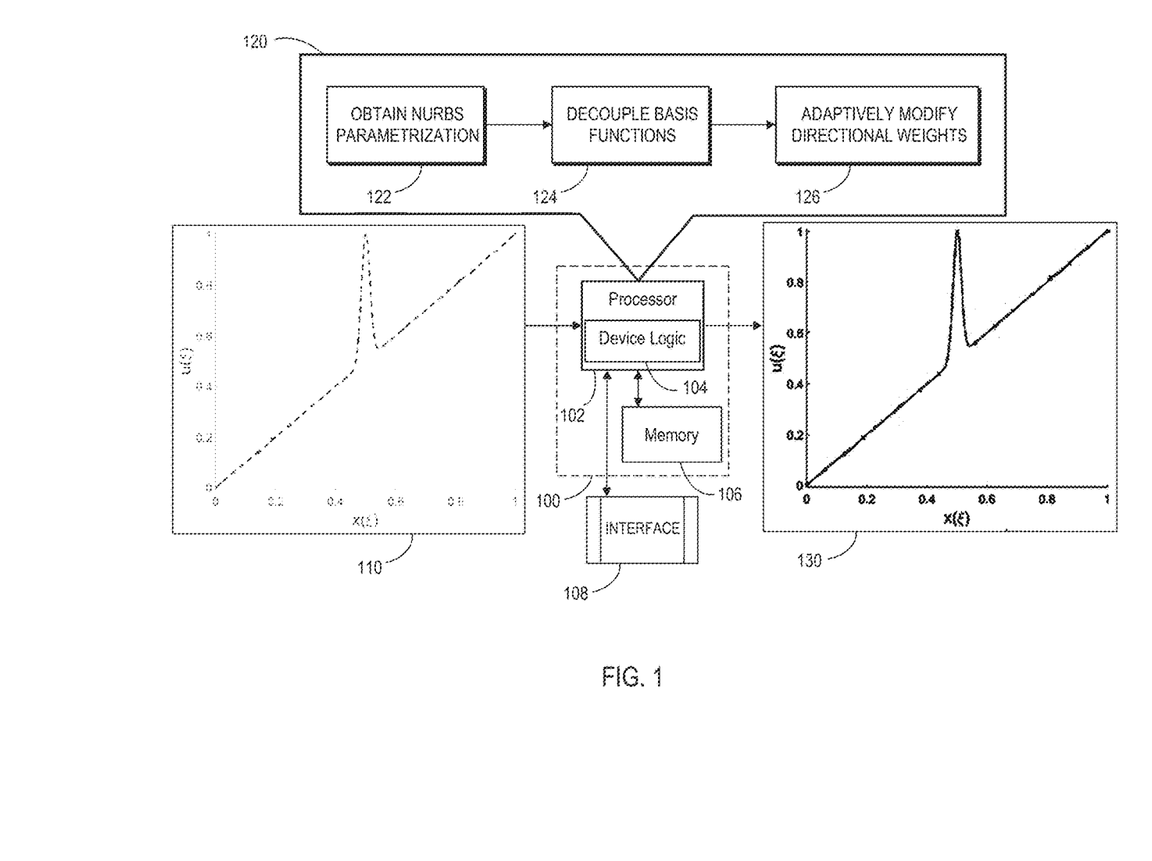
FIG. 1 is a diagram of an example system for producing a computational representation of an input data set using a generalized NURBS framework, in accordance with the present disclosure.

FIG. 1 illustrates an exemplary system for optimizing a model intended to represent a function, n-dimensional curve, field, surface, geometric object, or other data, in a parametrized space implemented by computation of a processor 102. A computing device 100 includes the processor 102, which executes device logic 104 within the processor 102 or contained in memory 106 of the computing device 100. The device logic 104 configures the processor 102 to perform the processes described herein. The computing device 100 may be a server computer or a system of interconnected server computers, such as a web server, application server, application platform, virtual server, cloud data server, and the like, or a personal computer, laptop computer, tablet computer, e-reader, smartphone, personal data assistant, microconsole, industrial automation system, or similar computing device having, as the processor 102, a central processing unit (CPU), microprocessor, or other suitable processor.

In some embodiments, the device logic 104 and/or memory 106 may store program instructions and other data for a computer-aided drafting (CAD) program, or another suitable program, for creating, modifying, exporting, and performing other processes on data (e.g., files, database records, data streams, etc.) representing structural objects, such as two- and/or three-dimensional designs of objects that can be fabricated by additive manufacturing processes. In some embodiments, the device logic 104 and/or memory 106 may store program instructions and other data for an isogeometric analysis (IGA) program or another program for finding solutions to partial differential equations (via finite element method (FEM) or otherwise). The program instructions and other data for performing the processes herein may cooperate with any such program; examples are described below.

The processor 102 receives, as input, a data set 110 representing the optimization problem. That is, the data set 110 includes the data to be represented by the model, described according to the domain of the data. In the illustrated example, the data set 110 describes a rapidly-varying function $u(x)=x+xe^{-(x-0.5)^2}$, which is to be approximated in a parametrized space. In various other embodiments, some examples of which are described below, the data set 110 may describe: a curve characterized by one or more functions, such as a rapidly-varying function, a smoothly-varying function, and/or a function with discontinuities; a curved geometry, such as a beam, a field, or a mesh; a two- or three-dimensional geometric structure or other object; or another set of data suitable for approximation. The data set 110 may be input by a user of an interface 108, which may be presented to a user on the computing device 100 or on another device, such as a drafting computer. The interface 108 may be presented on a display of the user device via a dedicated software application (e.g., a CAD program), an internet browser or other web application, or another suitable application in which the interface 108 is a component, such as in a web dashboard or other administration tool. In some embodiments, the interface 108 may be configured to prompt the user to provide the initial object design 110, and may present and facilitate one or more options for doing so. For example, the interface 108 may prompt the user to select a file for upload. The interface 108 may further prompt the user to enter other data used in the present processes, such as a desired number of control points.

The processor 102 executes the device logic 104 to apply a generalized NURBS ("G-NURBS") optimization process 120, described herein, to produce an optimized model 130 representing the data set 110. Generally, the process 120 may include the steps of obtaining a NURBS parametrization of the data set 110 (step 122) using the G-NURBS framework described below, adaptively and/or iteratively modifying the separate weights applied to the decoupled rational basis functions (step 124) to determine the optimal values that fit the G-NURBS approximation to the data set 110 with highest practical accuracy, and generating an optimized model 130, which is a generalized NURBS approximation or representation of the data set 110. The resulting optimized model 130 exhibits much better accuracy for many types of data sets 110 than known NURBS algorithms; further, in many cases generating a G-NURBS curve or field approximation, such as for a curve-fitting problem, requires less processing time and/or other computational resources in comparison to that required for a NURBS algorithm to solve the same problem. Particular examples of these improvements in computer functionality are shown further below.

The processor 102 may store the optimized model 130 (and any intermediate models), such as in memory 106, may present the optimized model 130 to a user via the user interface 108, and/or may export the optimized model 130 to another system (for example, sending an optimized model of a geometric structure to a 3D printer or other additive manufacturing device). Storage and/or transmission may be in any suitable format, including any format currently used to store and/or transmit NURBS approximations. For example, the optimized model 130 may be a file storing the G-NURBS approximation in the Initial Graphics Exchange Specification (IGES) format, which uses 80-character ASCII records to store the coordinates for control points and knots, as well as the weight of each control point; other typical formats in which G-NURBS approximations can be stored include STEP, ACIS, and PHIGS files.

The present framework for a generalization of NURBS, also referred to herein as "G-NURBS," improves the flexibility of NURBS, while also addressing a long-standing deficiency of NURBS: its inability to accurately capture discontinuities and localized gradients. This deficiency is well-known, and it reveals itself in many applications including IGA, topology optimization, fracture mechanics, etc. G-NURBS and its benefits are presented herein in the context of comparison to known NURBS approaches, but combinatorial uses of G-NURBS with NURBS and other surface representations is also contemplated.

The key concept of the G-NURBS framework is the decoupling of the NURBS rational basis functions. In particular, starting from a typical NURBS curve defined in three directions (x, y, u), the rational basis functions are explicitly decoupled along the different directions, producing the following generalization:

$$\left. \begin{array}{l} x(\xi) = \sum_{i=0}^{n} R_{i,p}^{x}(\xi)x_i \\ y(\xi) = \sum_{i=0}^{n} R_{i,p}^{y}(\xi)y_i \\ u(\xi) = \sum_{i=0}^{n} R_{i,p}^{u}(\xi)u_i \end{array} \right\} 0 \leq \xi \leq 1$$

where each decoupled rational basis function R has its own weight $w_i$, which is decoupled from the other weights, providing more flexibility and control:

$$R_{i,p}^{x}(\xi) = \frac{N_{i,p}(\xi)w_i^x}{\sum_{j=0}^{n} N_{j,p}(\xi)w_j^x}$$

$$R_{i,p}^{y}(\xi) = \frac{N_{i,p}(\xi)w_i^y}{\sum_{j=0}^{n} N_{j,p}(\xi)w_j^y}$$

$$R_{i,p}^{u}(\xi) = \frac{N_{i,p}(\xi)w_i^u}{\sum_{j=0}^{n} N_{j,p}(\xi)w_j^u}$$

The theoretical foundations of such generalizations must first be established. Conceptually, while a NURBS curve (together with a field) may be represented as:

$$C(\xi) = \sum_{i=0}^{n} R_{i,p}(\xi)P_i, \, 0 \leq \xi \leq 1$$

a G-NURBS curve (or field) would be represented as:

$$C(\xi) = \sum_{i=0}^{n} R_{i,p}(\xi) \odot P_i, \, 0 \leq \xi \leq 1$$

where $R_{i,p}(\xi)$ denotes a vector set of rational basis functions, and $\odot$ denotes the component-wise product of two or more vector variables. Similar generalization can be made in higher dimensions; for example, a G-NURBS surface would be defined via:

$$S(\xi, \eta) = \sum_{i=0}^{n_1} \sum_{j=0}^{n_2} R_{ij,pq}(\xi, \eta) \odot P_{ij} \quad \begin{array}{c} 0 \leq \xi \leq 1 \\ 0 \leq \eta \leq 1 \end{array}.$$

As further foundation for comparing the proposed G-NURBS framework to a NURBS framework, critical properties of the NURBS rational basis functions $R_{i,p}(\xi)$ are summarized below.

Non-Negativity:

The rational basis functions only take positive or zero values.

Partition of Unity:

The sum of the rational basis functions at any parameter value is one (this plays an important role in field modeling using NURBS):

$$\sum_{i=0}^{n} R_{i,p}(\xi) = 1$$

Local Support:

The rational basis function $R_{i,p}(\xi)$ is non-zero only over the interval $(\xi_i, \xi_{i+p-1})$.

Continuity:

Every rational basis function $R_{i,p}(\xi)$ is infinitely differentiable in the interior of a knot interval. Further, at any knot of multiplicity k, the rational basis function is $c^{p-k}$ continuous.

B-Spline Inclusion:

If the weights are all equal, then the rational basis function reduces to a B-Spline basis function.

From these properties, the properties of a typical 2-D NURBS curve may be derived; furthermore, it can be shown that the proposed G-NURBS curve satisfies some but not all of these properties.

End Point Interpolation:

The knot vectors can be constructed such that the interpolating curve passes through the end points. One can easily show that this property is also satisfied by G-NURBS, i.e., the knot vectors can be constructed such that the interpolating G-NURBS curve passes through the end points.

Strong Convex Hull:

The NURBS curve is contained within the convex hull of the control points. Moreover, if $\xi$ lies in a knot span $[\xi_i, \xi_{i+p-1})$ then the point lies in the convex hull of the associated control points. This plays an important role, for example, in finding the intersection of a NURBS curve and a straight line. On the other hand, this property may be violated by G-NURBS. In other words, a G-NURBS curve need not lie in the convex hull of its control points. However, numerical experiments suggest that G-NURBS may satisfy a weaker "Strong Bounding Box" property, i.e., that every G-NURBS segment lies within the coordinate-oriented bounding box of the corresponding control points.

Local Modification:

Changing a control point $(x_i, y_i)$ or weight $w_i$ only affects the curve over the interval $(\xi_i, \xi_{i+p-1})$. Similar to NURBS, one can show that, in G-NURBS, if a control point Pi is moved, or if any of the weights $w^d$ (d=x, y, z) are changed, it affects only the curve segment over the interval $[\xi_i, \xi_{i+p-1})$. However, changing the weights will only affect the parameterization of the curve in the corresponding physical coordinate direction d while preserving the parameterization in the other directions. This is, in fact, the key difference between G-NURBS and NURBS which significantly increases control.

Variation Diminishing Property:

No straight line intersects a NURBS curve more number of times than it intersects the curve's control polygon. It is presently unclear whether G-NURBS conforms to this property.

Continuity:

A NURBS curve is infinitely differentiable in the interior of a knot interval. Further, at any knot of multiplicity k, the rational basis function is $c^{p-k}$ continuous. This property carries over into G-NURBS.

B-Spline Inclusion:

If the weights are all equal then the NURBS curve reduces to a B-Spline curve. For G-NURBS, if weights in all directions are all equal, the curve will reduce to a B-Spline curve.

Referring again to FIG. 1, in some embodiments the optimization process 120 using the G-NURBS framework may begin with a parametrization (step 122) of the data set (e.g., curve or surface) to be represented; this parametrization may be performed according to any suitable NURBS algorithm, such as the well-known global fitting of a field u(x) over a domain with minimal $L_2$-norm error. Thus, the processor 102 may determine the set of control points, knots, and initial weight(s) to be used in the NURBS rational basis functions. Then (at step 124), the processor 102 may decouple the rational basis functions and their corresponding weights from each other along different directions within the domain or associated coordinate system. As shown in the above equations, decoupling the rational basis functions allows for decoupling of the associated weights, while the other NURBS parameters (i.e., control points, knots) determined in the parametrization (step 122) remain unchanged.

When the weights are decoupled according the G-NURBS framework, changing the value of one of the weights does not alter the entire underlying curve, mesh, or geometry, as it would in a NURBS parametrization. The decoupled weights may thus be used as additional design variables, whereby a set of particular values for each weight may produce the optimal fit to the data set 110. However, in some embodiments the optimal value for each of the weights is not immediately known upon decoupling the rational basis functions. Thus (at step 126), the processor 102 may perform an adaptive or iterative process to determine the optimal values for each of the weights. In some embodiments, the optimal values are a set of values for the weights that cooperate to achieve a desired accuracy of fit in each direction corresponding to one of the weights.

Figure 2:
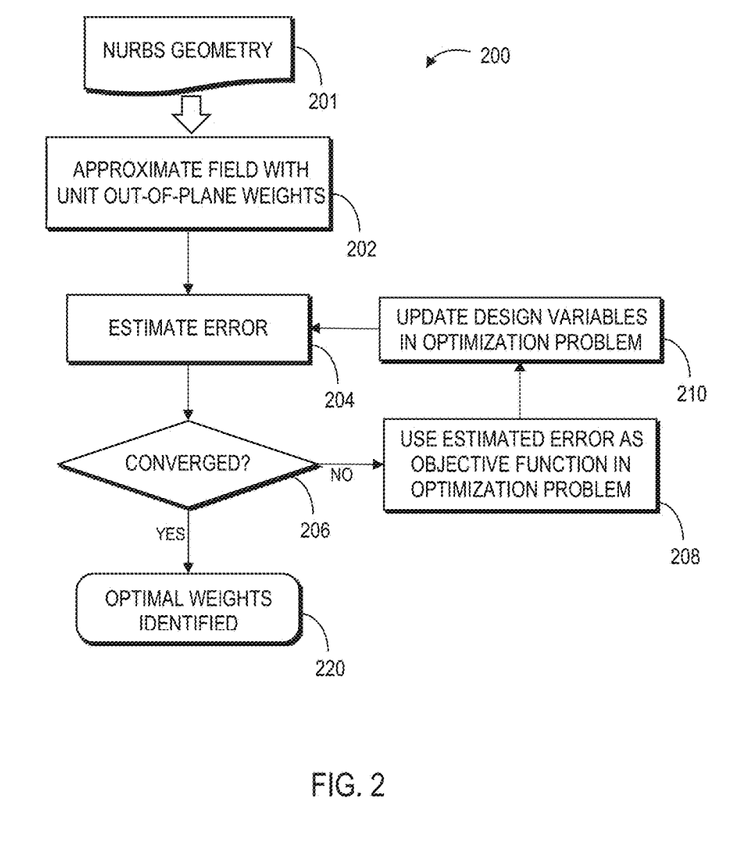
FIG. 2 is a flowchart of a method of adaptively determining optimal weights of a G-NURBS approximation.

FIG. 2 provides an exemplary method 200 for adaptively finding the optimal values for the decoupled weights, as in step 126 of FIG. 1. Receiving the NURBS geometry 201 with decoupled rational basis functions and weights, at step 202 the system may perform an initial approximation of the field using unit out-of-plane weights (i.e., $w_{ij}^u=1$, $\nabla i, j$) as inputs to the decoupled rational basis functions. At step 204, the system may estimate the error of this initial approximation compared to the input data set, using any suitable error estimation technique(s). At step 206, the system determines, based on the estimated error, whether the field approximation is converged with the data set. In some embodiments, the system determines that the field approximation and the data set are converged if the estimated error is within a predetermined threshold of accuracy.

If the field approximation has not converged, the weights are not at their optimal values and the field approximation must be iterated. Thus, at step 208 the system may set up an unconstrained optimization problem using the estimated error as an objective function thereof. As an example, if the number of weights is 20, the corresponding optimization problem will involve 20 design variables. Suitable methods to solve such unconstrained optimization problems include non-linear conjugate gradient. At step 210, the system may update the design variables, including one or more of the decoupled weights, to new values that resolve the optimization problem. To determine the new values, the derivative of the objective (estimated error) with respect to the weights is computed; this can be done using, for example, finite difference method or analytical expressions. The derivative is also referred to as sensitivity. Once the sensitivity is computed, the weights are modified in direct proportion to their respective sensitivities. For example, a weight with highest sensitivity towards decreasing the error function will be increased the most. The system then re-estimates the error (i.e., returns to step 204) using the new design variable values, and continues to iterate the process (steps 204-210) until the field approximation has converged with the input data. At this point (step 220), the optimal weights are identified.

General Examples

Several examples are now described to demonstrate the proposed G-NURBS framework and optimization methods. The examples relate to fitting problems in one-, two-, and three-dimensional space; the underlying computations may be used or adapted for use in different spheres of application, such as the CAD, IGA, and topological optimization applications described further below.

Figure 3A:
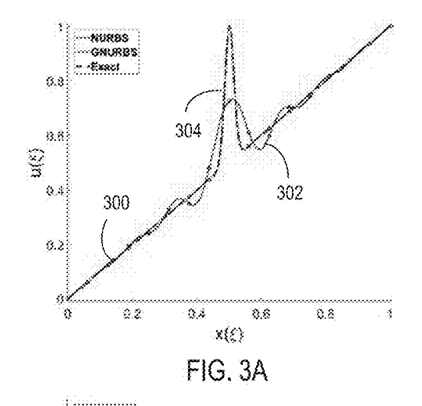
FIG. 3A is a diagram comparing a NURBS approximation of a rapidly-varying function to an approximation produced in accordance with the present disclosure.
Figure 3B:
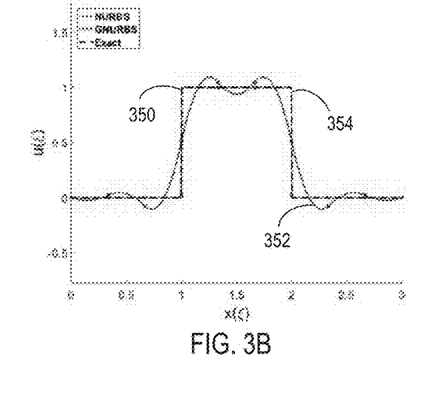
FIG. 3B is a diagram comparing a NURBS approximation of a discontinuous function to an approximation produced in accordance with the present disclosure.
Figure 3C:
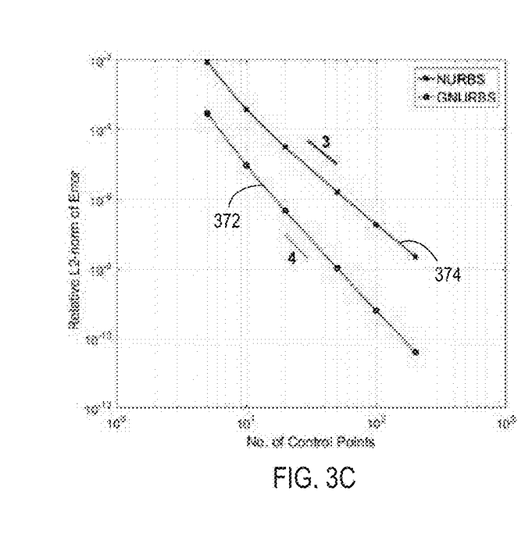
FIG. 3C is a diagram comparing NURBS approximations of a smooth function to approximations produced in accordance with the present disclosure.

Functions:

FIGS. 3A-C illustrate comparative solutions between fitting a representation of a function to the function itself, using NURBS and G-NURBS. FIG. 3A illustrates field representations of the rapidly-varying function $u(x)=x+xe^{-(x-0.5)^2}$, illustrated in FIG. 1, with the values of the corresponding functions $x(\xi)$, $u(\xi)$ in the domain [0, 1]. The dotted line 300 represents the exact function. Line 302 illustrates the approximation of the rapidly-varying function using a quartic NURBS with 17 control points. The weights, being coupled, cannot be used as design variables because changing the value of one weight will affect the values of all of them, changing the underlying mesh parametrization. The resulting $L_2$ error for the NURBS approximation is $10^{-2}$, with clearly significant error in the region near the rapid change in the value of $u(\xi)$. Alternatively, the fit is addressed using a "non-linear least squares" optimization problem represented by the G-NURBS decoupled rational basis functions described above. Line 304 illustrates the approximation using the G-NURBS framework with optimal values selected for the decoupled weights and all other parameters (control points, knots) remaining the same as for the NURBS approximation of line 302. The fit of line 304 to line 300 is nearly exact, with the $L_2$ error being $10^{-4}$.

Similarly, FIG. 3B illustrates fitting of the Heaviside function, a discontinuous step function whose value is either zero (for negative arguments) or one (for positive arguments). Line 350 illustrates the exact function as represented by $(x(\xi), u(\xi))$. Line 352 illustrates the approximation of the Heaviside function using NURBS, and shows the inaccuracy of NURBS in representing discontinuous functions. Line 354 illustrates the approximation of the Heaviside function using G-NURBS with optimal values determined for the decoupled weights. The G-NURBS representation is nearly exact: while the $L_2$ error using NURBS is $10^{-1}$, the $L_2$ error using G-NURBS is $10^{-14}$.

The convergence of G-NURBS is superior to that of NURBS for smooth functions as well. FIG. 3C shows the convergence rate using quadratic NURBS and G-NURBS to approximate the function $u(x)=\sin(\pi x)$. The number of control points was varied (x axis) and the $L_2$ error computed (y axis). As the figure illustrates, the G-NURBS technique, represented by line 372, leads to an order of magnitude faster rate of convergence than that of the NURBS technique, represented by line 374 (slope of 4 for G-NURBS, versus 3 for NURBS). The improvement holds true in other variations of this test. For example, keeping the number of control points fixed, and varying the degree of the B-spline basis functions, G-NURBS was far superior; for example, with 8 control points, increasing the degree from 5 to 6 lowered the $L_2$ error from $10^{-5}$ to $10^{-6}$ in NURBS, whereas in G-NURBS the error was reduced from $10^{-9}$ to $10^{-12}$.

Fields and Surfaces:

As emphasized above, and particularly for fields and surfaces defined over a two-dimensional domain, optimizing the approximation cannot modify the underlying mesh parametrization. A "classic" NURBS representation of such a field is given by:

$$x(\xi, \eta) = \sum_{i=0}^{n_1} \sum_{j=0}^{n_2} R_{ij,pq}(\xi, \eta) x_{ij}$$

$$y(\xi, \eta) = \sum_{i=0}^{n_1} \sum_{j=0}^{n_2} R_{ij,pq}(\xi, \eta) y_{ij} \quad \begin{array}{c} 0 \leq \xi \leq 1 \\ 0 \leq \eta \leq 1 \end{array};$$

$$u(\xi, \eta) = \sum_{i=0}^{n_1} \sum_{j=0}^{n_2} R_{ij,pq}(\xi, \eta) u_{ij}$$

$$R_{ij,pq}(\xi, \eta) = \frac{N_{i,p}(\xi) N_{j,p}(\eta) w_{ij}}{\sum_{k=0}^{n_1} \sum_{l=0}^{n_2} N_{k,p}(\xi) N_{l,q}(\eta) w_{kl}}$$

where the same set of rational basis functions and weights are used along the three coordinates. The corresponding G-NURBS decoupled rational basis functions for the same field are given by:

$$x(\xi, \eta) = \sum_{i=0}^{n_1} \sum_{j=0}^{n_2} R^x_{ij,pq}(\xi, \eta) x_{ij}$$

$$y(\xi, \eta) = \sum_{i=0}^{n_1} \sum_{j=0}^{n_2} R^y_{ij,pq}(\xi, \eta) y_{ij} \quad \begin{array}{c} 0 \leq \xi \leq 1 \\ 0 \leq \eta \leq 1 \end{array}$$

$$u(\xi, \eta) = \sum_{i=0}^{n_1} \sum_{j=0}^{n_2} R^u_{ij,pq}(\xi, \eta) u_{ij}$$

where each of the rational basis functions will have its own set of weights $w_{ij}^x$, $w_{ij}^y$ & $w_{ij}^u$.

Figure 4A:
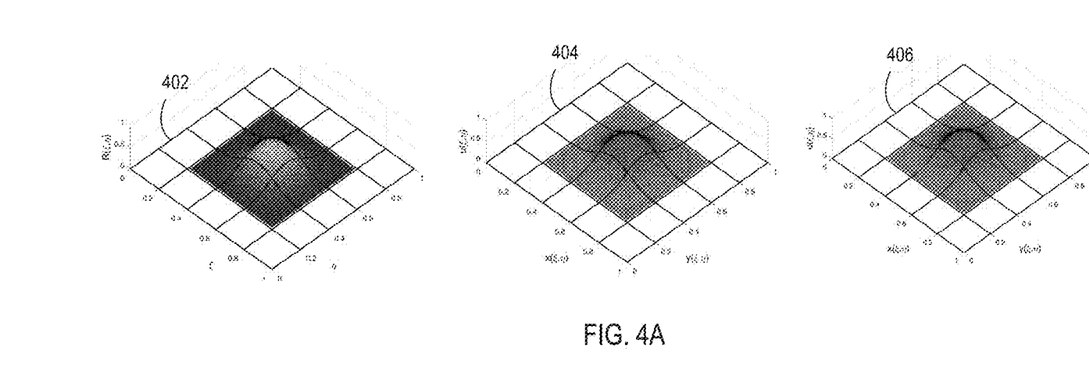
FIG. 4A is a diagram of comparative plots of field representations.
Figure 4B:
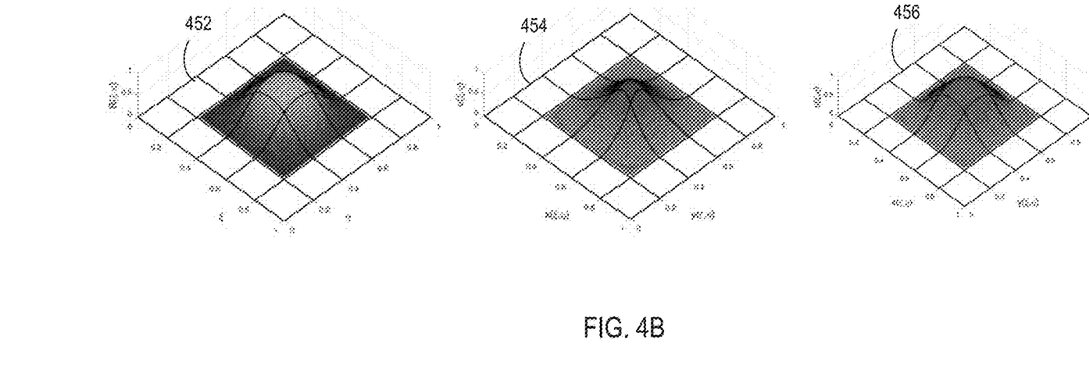
FIG. 4B is another diagram of comparative plots of field representations.

FIGS. 4A-B illustrate a square patch of the classic field representation in parametric space, NURBS space, and G-NURBS space; the patch is defined in all spaces by a net of 7×7 control points corresponding to vertices of an underlying mesh parametrization, and by quadratic B-spline basis functions based on the uniform knot vectors {0, 0, 0, 0.2, 0.4, 0.6, 0.8, 1, 1, 1} along both directions. Patch 402 illustrates a typical rational basis function $R_{44}(\xi, \pi)$ with all weights set to unity (i.e., a value of 1), in parametric space. Patch 404 illustrates the corresponding NURBS field representation with a single non-zero control variable (height) $u_{4,4}=1$. Patch 406 illustrates the corresponding G-NURBS field representation where the weights $w_{44}$ are all set to 1 for all directions. With all weights set to unity, the condition of the field in all three patches 402-406 is the initial condition of the generated approximations in parametric space, as a NURBS field, and as a G-NURBS field, respectively. The edges of each mesh, which each connect two of the control points, lie in the field; in the initial conditions (i.e., all three patches 402-406), the edges project directly onto the underlying planar grid (i.e., viewing the patch 404, 406 along a normal to the x-y plane, the mesh would appear to be a uniform grid).

Increasing the weight $w_{44}$ from unity to, for example, a value of four has the effects on the representations of FIG. 4A shown in FIG. 4B. Patch 452 illustrates the rational basis function $R_{44}$ ($\xi,\eta$) in parametric space, and patch 454 illustrates the NURBS representation, with $w_{44}=4$. It is clear that the NURBS representation of the field no longer conforms to the field in parametric space. Moreover, the NURBS representation deforms the mesh parametrization (compared to the parametric space)—specifically, the x-y distance between any two edges of the center polygon decreases, deforming the adjacent polygons in the x-y plane to compensate. This can cause several undesirable consequences. In one example, each time the underlying mesh is modified, the Jacobian and sensitivity computations needs to be reevaluated; this can significantly increase the computational cost and complicate the derivation of analytical sensitivities. In another example, as the quality of the domain parameterization deteriorates, the Jacobian may tend to zero, or even change sign (invalid parameterization); this leads to significant numerical errors in IGA, or even failure. In yet another example, if a weight associated with a boundary control point is modified (rather than an interior control point as in this example), the geometry will change.

In contrast, using G-NURBS the desired field deformation (i.e., that shown in patch 452) can be achieved without deforming the underlying mesh. Simply, the weight in the direction $u(\xi, \pi)$ is increased to $w_{44}{}^u=4$, while the weights in the other directions are not modified. This produces the patch 456 in which the field is modified (i.e., the height is increased at point (4, 4)) without altering the underlying mesh parametrization (i.e., the edges still project directly onto the underlying planar grid). Since the underlying mesh is not altered in G-NURBS, the Jacobian remains unchanged during the adaptive determination of the optimal weights, and the sensitivity computations are less intensive than for the same modifications using NURBS. Similarly, while fitting data using NURBS typically leads to a linear least squares problem, G-NURBS leads to a non-linear least squares problem, with higher accuracy. The weight refinement technique of G-NURBS has general applicability to free-form three-dimensional surfaces as well as planar, solid, and other simple and complex geometries. A specific example of this is provided below in the context of ISA applications. Additional non-limiting applications and potential applications will now be described.

Applications in IGA

The concept behind isogeometric analysis (IGA) is to exploit the NURBS representation to model both the geometry and the underlying field. Through IGA, mesh generation can be circumvented, leading to tight CAD/analysis integration; additional advantages include high accuracy and analytical sensitivities for robust optimization. G-NURBS addresses several challenges in IGA that are caused by and/or are not resolved by known NURBS techniques.

Refinement Techniques:

The primary task in "adaptive refinement" in IGA is to improve the accuracy of a field approximation through error estimation and refinement. Combined with well-established error estimation strategies, there are several competing refinement strategies in IGA: (1) h-refinement, where additional knots are inserted, analogous to mesh refinement in classic finite element method (FEM); (2) p-refinement, where the degree of the B-spline basis function is increased (analogous to p-refinement in FEM); (3) k-refinement, exclusive to IGA and combining degree elevation with knot insertion, where higher order of continuity is achieved by increasing the order of basis functions; and (4) r-refinement, where the inner control points are optimized adaptively, without increasing the polynomial order or number of knots. All of these strategies attempt to improve accuracy via modification of the physical mesh to keep the geometric representation unchanged. The first three strategies increase the degrees of freedom, while the r-refinement strategy does not, and is therefore favorable.

Unfortunately, r-refinement rarely leads to significant improvement in accuracy. Further, the r-refinement strategy leads to an optimization problem with a large number of constraints and design variables (N×d variables, where N is the number of control points and d is the dimension of the problem) that is very expensive to solve, and derivation of analytical sensitivities is correspondingly very complex and expensive, even more expensive than numerical differentiation techniques. The strategy also cannot be used on one-dimensional curved domains, free-form surfaces, or any other geometry that is changed by moving control points.

The G-NURBS framework can be implemented to resolve all of these drawbacks, by moving the design variables (i.e., the decoupled weights) into the solution space. Consequently, the framework: is applicable to any arbitrary type of geometry; involves solving an unconstrained optimization problem; preserves the computational mesh, simplifying the calculation of sensitivities and leading to cost-effective derivation of full analytical sensitivities; produces substantially better accuracy in both smooth and rapidly varying problems; involves a smaller number of design variables (always N design variables irrespective of the dimension of the problem); and, results in a higher rate of convergence indefinitely.

Figure 5:
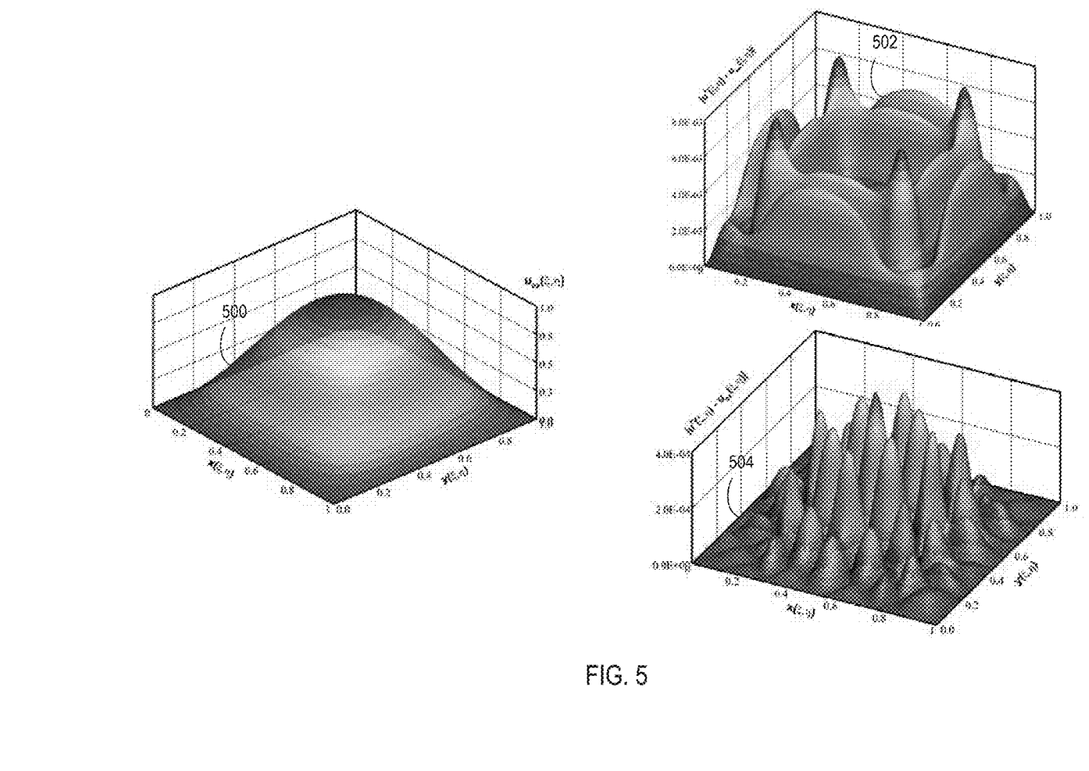
FIG. 5 is a computer-simulated diagram of a field and comparative plots of field errors in representations of the field.

FIG. 5 illustrates the improvement of G-NURBS over NURBS for adaptive refinement of IGA in the context of field error. The exemplary field is governed by the following differential equation over a square domain:

$$\nabla^2 u + 2\pi^2 \sin \pi x \sin \pi y = 0, x \in [0,1] \otimes [0,1]$$

Homogeneous (zero) boundary conditions are imposed on all edges; thus the closed-form solution is given by $u_{ex}=\sin \pi x \sin \pi y$, and is illustrated by plot 500. The mesh consist of a net of 6×6 control points. The 'unknown' field u may be defined using the NURBS rational basis function R:

$$u(\xi, \eta) = \sum_{i=0}^{n_1} \sum_{j=0}^{n_2} R_{ij,pq}(\xi, \eta) u_{ij}$$

where $u_{ij}$ are the unknown control variables. The values of these may be identified by constructing a linear system of equations, such as using classic variational formulation or any other suitable calculus. The exact solution (plot 500) is known, so the field error of the NURBS approximation may be computed using any suitable error estimation strategy; the plot 502 represents the field error of the NURBS based IGA. Refinement strategies such as r-refinement may be applied to reduce the error.

In a G-NURBS implementation of IGA, the corresponding field is represented by:

$$u(\xi, \eta) = \sum_{i=0}^{n_1} \sum_{j=0}^{n_2} R_{ij,pq}^u(\xi, \eta) u_{ij}$$

where the field rational basis functions each have their own weights w, decoupled as described above:

$$R_{ij,pq}^u(\xi, \eta) = \frac{N_{i,p}(\xi) N_{j,p}(\eta) w_{ij}^u}{\sum_{k=0}^{n_1} \sum_{l=0}^{n_2} N_{k,p}(\xi) N_{l,q}(\eta) w_{kl}^u}$$

The additional weights are used to better approximate the field, without perturbing the underlying geometry. Similar to the curve approximation, this leads to a non-linear variational formulation, where the weights are optimized to minimize the error, while the field variables are solved in an inner loop. Again, the field error may be calculated from the exact solution; plot 504 illustrates the field error in G-NURBS based IGA, and indicates a four-fold improvement in accuracy over NURBS with no increase in the degrees of freedom.

Non-Homogenous Essential Boundary Conditions:

A second challenge in IGA is imposition of non-homogenous essential boundary conditions, such as imposition of non-zero temperature on the boundary. Due to the non-interpolatory nature of NURBS basis, direct imposition of such boundary conditions at control points can lead to significant error, and non-optimal rate of convergence. Several strategies have been proposed to address this deficiency; these include weakly Lagrange multiplier method, Nitsche method, or strongly via least square fitting, collocation and transformation methods, quasi interpolation techniques, and coupling with Lagrange shape functions.

Figure 6:
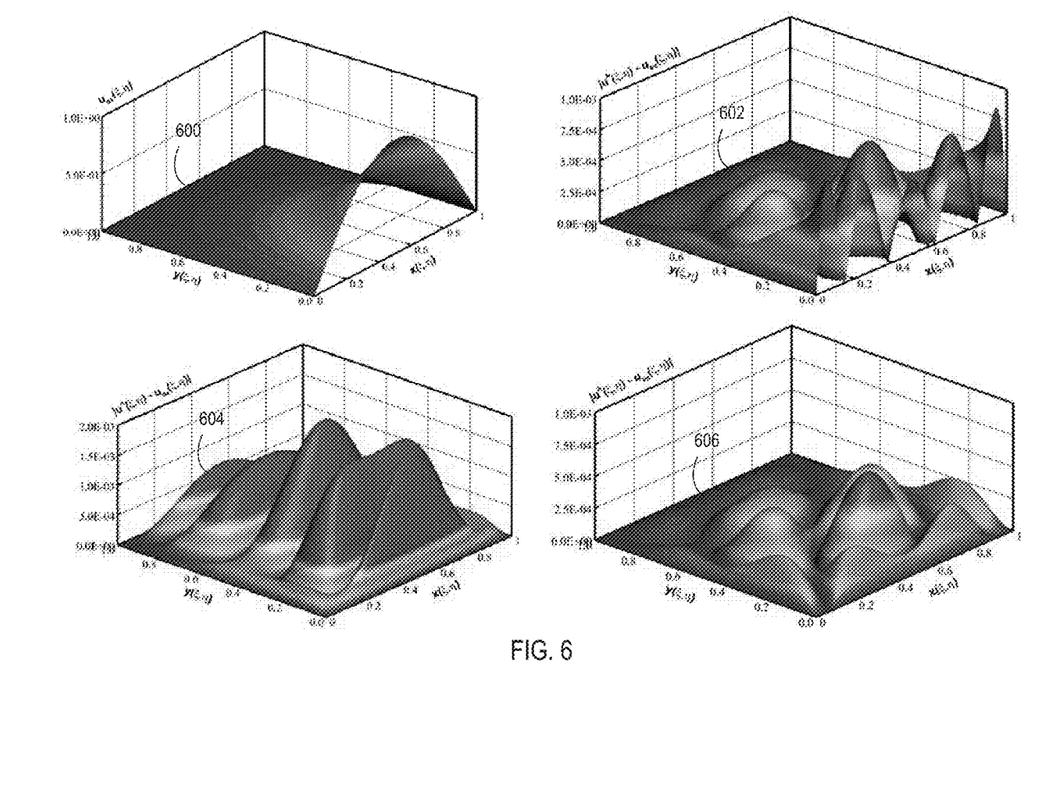
FIG. 6 is a computer-simulated diagram of another field and comparative plots of field errors in representations of the field.

An example problem demonstrates that the G-NURBS framework can be adapted for a boundary condition imposition method that greatly improves accuracy of the approximation. Consider a Poisson equation $\nabla^2 u=0$, $x \in [0,1] \otimes [0,1]$ subject to the boundary conditions $u(x, 0)=\sin(\pi x)$ and $u(x, 1)=u(0, y)=u(1, y)=0$. The exact solution is given by $u(x, y)=\{\cos h(\pi y) - \cot h(\pi) \sin h(\pi y)\} \sin(\pi x)$ and is shown in FIG. 6 as plot 600. The solution may be approximated by generating quartic NURBS rational basis functions in both directions, and then applying the linear least square method to impose the boundary conditions. Plot 602 illustrates the resulting error of the classic NURBS solution. The significant error near the boundary is of serious concern in many applications including structural mechanics where high stresses (derivatives of the field) typically occur near the boundary.

Additionally or alternatively, a G-NURBS curve defined by the equations of the previous section may be fit to the boundary profile, using a non-linear least square algorithm and strong imposition of the solution. Plot 604 illustrates the resulting error, and shows that the error near the boundary has essentially vanished (4 orders of magnitude higher accuracy than plot 602). However, the error in the interior of the field is increased over that of classic NURBS shown in plot 602. This is due to the coupling in the weights along the two parametric directions. To address this, the G-NURBS field representation rational basis functions may be further generalized so that the weights are also decoupled with respect to parametric directions:

$$B_{ij,pq}^u(\xi, \eta) = \frac{N_{i,p}(\xi) N_{j,q}(\eta) w_{ij}^{u,\xi} w_{ij}^{u,\eta}}{\sum_{k=0}^{n_1} \sum_{l=0}^{n_2} N_{k,p}(\xi) N_{l,q}(\eta) w_{kj}^{u,\xi} w_{il}^{u,\eta}}$$

The directional weighting provides additional flexibility; using this generalization with smart manipulation of the indices, a basis may be expanded along one parametric direction while keeping the surface parameterization in the other direction intact.

This generalization may address the essential boundary conditions by fitting a G-NURBS curve to the boundary profile and assigning the extracted data to the appropriate weights and boundary control variables. The resulting error of this solution is illustrated by plot 606, which shows that the error has now decreased significantly both on the boundary as well as in the interior. The illustrated error distribution results in a surprising four orders of magnitude better accuracy over the boundary, and 32% over the entire domain.

Field Approximation Using IGA:

The above approaches to using G-NURBS for adaptive refinement and imposition of boundary conditions have particular use in field approximation applications. With respect to adaptive refinement, since the introduction of FEM there has been tremendous attempt to solving differential equations with rapid local variations and strong gradients in an efficient manner. Such scenarios occur frequently in both solid and fluid mechanics applications such as fracture mechanics, advection-diffusion problem with dominated advection, heat conduction problems, and the line. In particular, in IGA, due to lack of classic local refinement property as in Lagrange basis functions, addressing this issue has recently been the main focus of the community. The common idea being pursued is the use of hierarchical basis functions in an adaptive fashion. However, this approach usually leads to drawbacks such as loss of higher order continuity, increasing the condition number of the resulting system of equations which makes it expensive to solve, etc. The adaptive refinement strategy proposed herein, based on the decoupling of weights in the G-NURBS framework, offers several advantages.

In field approximation, it is similarly common to have boundary conditions with rapid local variations and discontinuities. A simple example of non-homogeneous essential boundary conditions is the heat-conduction problem over an arbitrary domain where the temperature distribution over some boundaries of the domain is specified. The common way of imposition of these boundary conditions is 'strongly,' which leads to a special approximation problem with fixed in-plane parametrization. As the numerical results above suggest, despite yielding adequate accuracy in case of smooth boundary profiles, NURBS approximation will yield poor results if there are any abrupt changes in the boundary condition profile. While numerous different techniques have been proposed for treating essential boundary conditions in IGA, all of them lead to similar level of accuracy and none of them are able to address non-smooth profiles with adequate accuracy. G-NURBS curve-fitting at the boundary, as described above, resolves the accuracy issues.

Applications in Structural Optimization

Owing to being a powerful tool for the representation of complex surfaces with higher order continuity in addition to important properties such convex hull, NURBS parameterization has been widely used in a vast variety of applications for the optimization of different fields over the computational domain. For instance, a response surface based on NURBS has been used to model the complex material behavior under a wide range of load conditions. Another application uses Bspline basis for the representation of density field in FEM-based topology optimization. Within the framework of IGA, numerous studies have been performed where the same NURBS based parameterization of computational domain have also been used for the representation of different fields which need to be optimized over the domain in a variety of applications such as topology optimization, optimization of material distribution in FGMs, variational formulation of stress constraints, etc.

However, all of these approaches only treat the out-of-plane coordinates of control points as the design variables for the representation of the desired field. Such representation will provide sufficient flexibility for finding the optimum distribution of the desired field with fair accuracy in case of smooth fields, but it will also give rise to undesirable results when fields include abrupt and rapid variations. An obvious example of such problems is structural topology optimization where the transition between solid and void phases is desired to happen as sharp as possible.

In the proposed G-NURBS representation with decoupled weights, the out of plane weights may be used as additional design variables while setting up the optimization problem, irrespective of the type of underlying geometry. As numerical results above suggest, G-NURBS can capture such rapid changes and even discontinuities with astounding accuracy while keeping the geometry and mesh representation intact. It is also important to note that G-NURBS representation inherits all the key properties of NURBS that are crucial for being used in this class of applications. The G-NURBS approximation of the Heaviside function above demonstrates the capability of G-NURBS in capturing discontinuities, which is much desired in structural topology optimization where the transition between solid and void phases should happen as sharp and crisp as possible. Furthermore, even in the case of smooth problems, G-NURBS yields significant better performance and higher rate of convergence. Therefore, it seems plausible to employ G-NURBS representation even in case of optimization problems where the desired field to be optimized is expectedly smooth.

Applications in Data Approximation

A general example of data approximation using G-NURBS, where the underlying geometry and parameterization need to remain unchanged, has been described at length above. This special type of approximation arises in certain problems such as treatment of non-homogeneous essential boundary conditions in IGA. However, the G-NURBS framework is adaptable to a general approximation problem where no such requirements exist. For example, a global approximation problem includes three main steps: data parametrization; construction of knot vector; and assembly of a system of equations. It can be shown that if the weights are not treated as extra design variables (Bspline approximation), the problem leads to a linear least-square problem. In a simple 3D curve approximation problem, for example, the design variables will be all coordinates of control points $(X_i, Y_i, Z_i)$. The problem formulation will finally lead to three separate N×N linear systems of equations yielding these unknown coordinates respectively.

As this algorithm might not yield satisfactory results in case of uneven data with sudden changes, one can treat the weights as additional design variables to obtain better accuracy (NURBS approximation), at the expense of obtaining a 4N×4N non-linear least-square problem. The coupled weights produce a large, coupled, non-linear least-square problem, which will be computationally expensive to solve. Moreover, numerical results in the literature suggest that treating the coupled weights as additional design variables will not result in dramatic improvement in accuracy especially in problems with sharp corners or discontinuities.

Following a similar procedure using G-NURBS with decoupled weights, the problem leads to three separate 2N×2N non-linear least-square problems with unknowns $(X_i, w_i^x)$, $(Y_i, w_i^y)$ and $(Z_i, w_i^z)$, respectively. While the overall cost of solving this problem would possibly be competitive to NURBS-approximation, the numerical results herein indicate that significantly better accuracy can be expected.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for using B-splines to represent a data set in a computing environment, the method comprising:

receiving electronic data comprising the data set representing a geometry in a first direction, a second direction, and a third direction to define a three-dimensional space of the computing environment; and generating a first generalized non-uniform rational B-spline (G-NURBS) representation of the electronic data, the first G-NURBS representation defined by:

a plurality of control points that determine a shape of one or more of the B-splines in a first direction and a second direction;

a plurality of weights each associated with a corresponding control point of the plurality of control points, the plurality of weights including a plurality of first weights modifying influence of the corresponding control point on the shape in the first direction, and a plurality of second weights modifying influence of the corresponding control point in the second direction; and a plurality of rational basis functions each depending on a corresponding weight of the plurality of weights, the plurality of rational basis functions including a plurality of first rational basis functions associated with the first direction and a plurality of second rational basis functions associated with the second direction;

each of the plurality of control points being associated with one of the first rational basis functions, one of the second rational basis functions, the first weight on which the corresponding first rational basis function depends, and the second weight on which the corresponding second rational basis function depends.

2. The method of claim 1, wherein generating the first G-NURBS representation comprises setting a first selected weight of the plurality of weights to a first value, the method further comprising generating, based on the first G-NURBS representation, a second G-NURBS representation of the electronic data, the second G-NURBS representation including the plurality of weights with the first selected weight set to a second value different from the first value and all other weights having an unchanged corresponding value.

3. The method of claim 1, further comprising determining a mesh parametrization of the data set, the mesh parametrization extending in a first direction and a second direction;
    wherein the first G-NURBS representation is generated based at least in part on the mesh parametrization; and
    wherein each of the weights has a corresponding value of a plurality of values and the rational basis functions are decoupled from each other such that changing the corresponding value of any one of the weights maintains the mesh parametrization unchanged.

4. The method of claim 3, further comprising:
    estimating a first $L_2$-norm error of the first G-NURBS representation relative to the mesh parametrization;
    determining that the first $L_2$-norm error indicates the first G-NURBS representation is not converged with the data set;
    identifying an unconstrained optimization problem associated with the data set;
    modifying the corresponding value of one or more of the weights to produce a second G-NURBS representation of the electronic data that corresponds to a solution to the unconstrained optimization problem;
    estimating a second $L_2$-norm error of the second G-NURBS representation relative to the mesh parametrization; and
    determining that the second $L_2$-norm error indicates the second G-NURBS representation is converged with the data set.

5. A computing device, comprising:
    a memory storing device logic; and
    a processor in communication with the memory and executing the device logic, wherein executing the device logic causes the processor to:
        receive electronic data representing a geometry in a first direction, a second direction, and a third direction to define a three-dimensional space of the computing environment; and
        transform, using a framework implemented in the device logic, the electronic data to produce an optimized representation of the electronic data in at least a first direction and a second direction, the optimized representation composed of a plurality of non-uniform rational B-spline (NURBS) curves, and the framework comprising a plurality of rational basis functions including:
            a plurality of first rational basis functions each having parameters that the processor applies to the electronic data to define one of the plurality of NURBS curves in the first direction; and
            a plurality of second rational basis functions each having parameters that the processor applies to the electronic data to define the one of the plurality of NURBS curves in the second direction, wherein modifying any parameter of one of the first rational basis functions does not require modification of any parameter of any of the second rational basis functions.

6. The computing device of claim 5, wherein each of the plurality of NURBS curves includes a corresponding plurality of control points that control a shape of the NURBS curve, and each of the rational basis functions determines a location of one of the control points in one of a plurality of directions including the first direction and the second direction.

7. The computing device of claim 6, wherein the each of the rational basis functions includes a corresponding weight of a plurality of weights that the processor applies to the electronic data to determine influence of each of the control points on the shape of the corresponding NURBS curve.

8. The computing device of claim 7, wherein each of the weights affects the influence of only one of the control points in only one of the plurality of directions.

9. The computing device of claim 5, wherein the electronic data describes one of a rapidly-varying function and a discontinuous function.

10. The computing device of claim 5, wherein:
    the optimized representation further represents the electronic data in a third direction that cooperates with the first and second directions to define the three-dimensional space;
    the plurality of NURBS curves cooperate to form at least one NURBS surface; and
    the plurality of rational basis functions further includes a plurality of third rational basis functions each having parameters that the processor applies to the electronic data to define one of the NURBS curves in the third direction, wherein modifying any parameter of one of the first rational basis functions or one of the second rational basis functions does not require modification of any parameter of any of the third rational basis functions.

11. The computing device of claim 10, wherein:
    the at least one NURBS surface includes a first NURBS surface having a shape defined at least in part by a plurality of control points;
    the framework associates each of the control points with a corresponding subset of the plurality of rational basis functions, each subset including one of the first rational basis functions, one of the second rational basis functions, and one of the third rational basis functions; and
    each of the plurality of rational basis functions depends upon a corresponding weight of a plurality of weights that the processor applies to the electronic data to determine influence of each of the control points on the shape of the first NURBS surface, the plurality of weights being decoupled from each other such that changing a corresponding value of one of the weights does not require changing the corresponding value of any other of the weights.

12. The computing device of claim 11, wherein to transform the electronic data, the processor executes the device logic to:
    obtain a mesh parametrization of the electronic data; and
    iterate an optimization process to produce, using the framework and the mesh parametrization, a sequential plurality of iterative representations of the electronic data, the optimized representation being the final iterative representation, wherein each successive iterative representation of the plurality of iterative representations is:
        produced by modifying one or more of the weights in an immediately previous iterative representation; and
        associated with the mesh parametrization without deforming the mesh parametrization.

13. A method, comprising:
    receiving electronic data to be approximated in a computing environment; and producing an optimized representation of the electronic data representing a geometry in a first direction, a second direction, and a third direction to define in a three-dimensional space of the computing environment, the optimized representation composed of a plurality of non-uniform rational B-spline (NURBS) curves extending in the three-dimensional space that conform to a framework comprising a plurality of rational basis functions including:
- a first rational basis function having parameters that the processor applies to the electronic data to define a first NURBS curve of the plurality of NURBS curves in the computing environment; and
- a second rational basis function having parameters that the processor applies to the electronic data to define the first NURBS curve in the computing environment, wherein modifying any parameter of the first rational basis function does not require modification of any parameter of the second rational basis function.

14. The method of claim 13, wherein producing the optimized representation comprises producing the plurality of NURBS curves within the framework wherein the first rational basis function defines the first NURBS curve in a first direction and the second rational basis function defines the first NURBS curve in a second direction.

15. The method of claim 13, wherein producing the optimized representation comprises producing a plurality of control points that control a shape of the first NURBS curve, each of the rational basis functions determining a location of one of the control points in one of a first direction and a second direction.

16. The method of claim 15, wherein producing the optimized representation comprises:
- determining a plurality of weights;
- using the plurality of weights and the electronic data to determine influence of each of the control points on the shape of the first NURBS curve, a first of the weights determining influence in the first direction and a second of the weights determining influence in the second direction.

17. The method of claim 13, further comprising determining a rapidly-varying function described by the electronic data, the optimized representation approximating the rapidly-varying function.

18. The method of claim 13, further comprising determining a discontinuous function described by the electronic data, the optimized representation approximating the discontinuous function.

19. The method of claim 13, further comprising determining a geometry described by the electronic data, the optimized representation approximating the geometry in a first direction, a second direction, and a third direction that cooperate to define the three-dimensional space of the computing environment, the framework further including a third rational basis function having parameters that define the first NURBS curve in the computing environment, wherein modifying any parameter of one of the first rational basis function or the second rational basis function does not require modification of any parameter of the third rational basis function.

20. The method of claim 19, wherein producing the optimized representation comprises iterating an adaptive optimization process to produce, using the framework and the mesh parametrization, a sequential plurality of iterative representations of the electronic data, the optimized representation being the final iterative representation, wherein each successive iterative representation of the plurality of iterative representations:
- is produced by modifying a corresponding parameter of the first rational basis function in an immediately previous iterative representation of the plurality of iterative representations; and
- is associated with the geometry without deforming the geometry.

* * * * *

UNITED STATES PATENT AND TRADEMARK OFFICE
CERTIFICATE OF CORRECTION

PATENT NO. : 10,102,671 B2
APPLICATION NO. : 15/428331
DATED : October 16, 2018
INVENTOR(S) : Krishnan Suresh et al.

Page 1 of 1

It is certified that error appears in the above-identified patent and that said Letters Patent is hereby corrected as shown below:

In the Specification

Column 1, Line 9, "CMM11232508" should be -- CMMI1232508 --

Column 1, Line 57, "they" should be -- the $y$ --

Column 10, Line 56, "$\nabla i$" should be -- $\forall i$ --

Column 12, Line 67, "$(\xi,\pi)$" should be -- $(\xi,\eta)$ --

Column 13, Line 42, "$(\xi, \pi)$" should be -- $(\xi,\eta)$ --

Column 15, Line 51, "={cos h($\pi$y)-cot h($\pi$)sin h($\pi$y)} sin($\pi$x)" should be
-- = {cosh($\pi y$) – coth($\pi$)sinh($\pi y$)}sin($\pi x$) --

In the Claims

Column 20, Line 18, "the" should be -- a --

Signed and Sealed this
Thirtieth Day of July, 2019

Andrei Iancu
*Director of the United States Patent and Trademark Office*